Nov. 28, 1950           J. M. MARSICO           2,531,738
ARTIFICIAL LURE
Filed Nov. 15, 1949
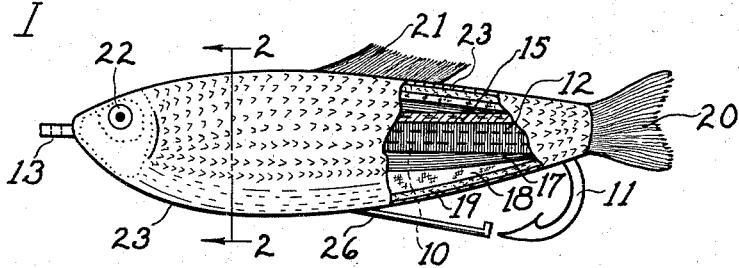
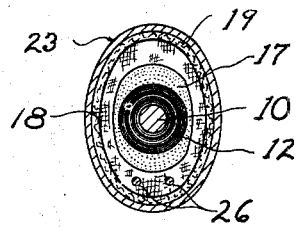
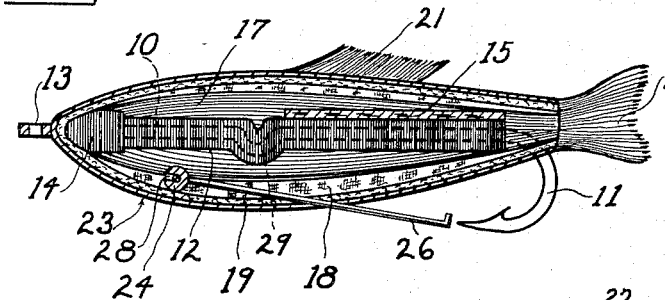
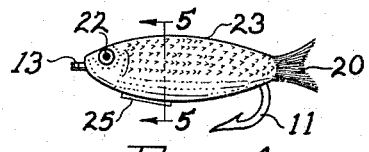
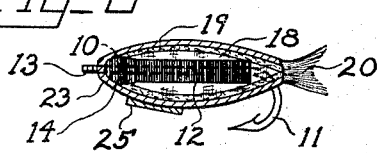
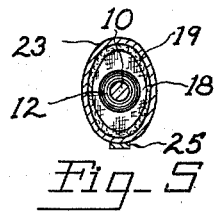
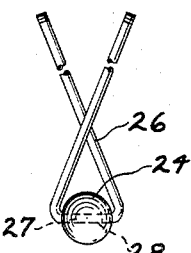
Inventor
JAMES M. MARSICO
By Harvey & O'Connell
Attorneys Patented Nov. 28, 1950

2,531,738

UNITED STATES PATENT OFFICE 2,531,738

ARTIFICIAL LURE

James M. Marsico, Creekside, Pa.

Application November 15, 1949, Serial No. 127,341

3 Claims. (Cl. 43—42.37)

This invention relates to artificial bait or fish lures.

A principal object of the present invention is to provide an artificial bait or fish lure and method of making the same, whereby the bait or lure may be cheaply and economically fabricated by hand, and at the same time the utility and efficiency thereof greatly enhanced.

Another object of the invention is to provide an artificial bait or fish lure in the form of a minnow and which may be used as a top water, or submerged, lure.

Still another object of the invention is to provide an artificial minnow which will have all the appearances of a live minnow, both as to form and as to movement, and which may be used to advantage with a fly rod for spinning, with a bobber for still fishing, and also which may be used for trolling and/or ice fishing.

A still further object of the invention is to provide a fish lure that is strong and durable, capable of being used again and again, and in which the shank of the hook forms a material portion of the body of the lure and in such a manner that the hook and body are maintained in proper relation at all times.

The invention, together with its objects and advantages, will be best understood when the following description is read with reference to the accompanying drawing in which are illustrated what are presently considered preferred embodiments of the invention, and wherein:

Figure 1 is a side elevational view of the artificial bait or fish lure embodying the features of the invention, with certain parts broken away and other parts shown in section;

Figure 2 is a transverse sectional view taken substantially on the line 2—2 of Figure 1;

Figure 3 is a longitudinal sectional view through the lure with certain parts shown in elevation;

Figure 4 is a side elevational view, on a reduced scale, of a slightly modified form of the invention;

Figure 5 is a transverse sectional view taken substantially on the line 5—5 of Figure 4;

Figure 6 is a longitudinal sectional view through the lure of Figure 4;

Figure 7 is a plan view of a combined balancing weight and weed guard forming part of the invention, and Figure 8 is a perspective view of an alternate form of buoyant material, forming part of the invention.

In each form of the invention illustrated, the body of the artificial bait or fish lure is formed about the shank 10 of a fish hook 11 in the following manner: The shank 10 is encased in a sheathing 12 composed of any desired number of wrappings of closely wound thread that is circumferentially wound around the shank for substantially the full length thereof from the eye 13 to the bill of the hook 11.

At the eye end 13 of the hook the sheathing 12 is diametrically enlarged and shaped to provide a head 14; head 14 being formed by closely winding a desired number of wrappings of thread about the sheathing 12 and in a manner to give to the head 14 the desired shape.

To impart the desired buoyancy to the lure there is disposed upon the sheathing 12 near the bill of the hook 11 a buoyant material 15. This buoyant material 15 may be in the form of a strip of cork or other suitable material adhesively secured to the sheathing 12 as shown to advantage in Figure 3 or, in the alternative, may be in the form of a tube as shown in Figure 8 and indicated by the reference numeral 16, as may be found desirable.

Surrounding the sheathing 12, head 14 and buoyant material 15 (or 16, as the case may be) is a filler 17 composed of strands of hair that extend from the head 14 to a point slightly beyond the sheathing 12 at the tail or rear end of the lure. About this filler 17 there is disposed a layer 18 of cotton. To this outer layer 18 of cotton are attached body feathers 19. In fabricating the body in the manner just described, the hair 17 are caused to adhere to the sheathing 12 by applying to the latter a surface coating of suitable glue after which the hair 17 are applied about the sheathing 12. The surface of the hair filler 17 is then coated with a glue which causes the layer of cotton to adhere thereto. After the cotton layer 18 has been applied the surface thereof is coated with glue to cause the body feathers 19 to adhere thereto. The tip 20 of the feathers extends beyond the barb or bill of the hook 11 and simulates the tail of a fish. Also the lure is provided with an upper fin 21 which, similar to the exterior surface of the fish and the tail 20, is formed of a feather and is adhesively united with the bait body.

The fillers 17 and 18 are so shaped to give to the body an outline to simulate the desired fish, in the present instance, a minnow.

Eyes 22 may be either cast into the body or painted thereon, and after the components of the body have all been assembled in the manner described, the body feathers 19 have applied thereto a coating 23 of varnish or the like which is waterproof, and is transparent so that the eyes and color of the body feathers are visible therethrough. This coating of varnish protects the components of the body and provides a smooth finished outer surface greatly enhancing the simulating effect of the lure.

It is contemplated by this invention that the tail piece 20 yield laterally to the force of the water playing thereagainst to enhance the animated activity of the minnow in the more or less accurate portrayal of a live minnow.

To insure that the bait will at all times assume a proper position in the water and thus accurately simulate a live minnow, the forward portion of the body of the bait, slightly inwardly from the head end thereof, is provided at the bottom or belly side thereof with a weight. This weight may be either in the form of a pellet 24 imbedded in the body as shown to advantage in Figure 3, or may be in the form of a metal plate 25 suitably secured to the body as shown to advantage in Figures 4 to 6. The weight (24 or 25, as the case may be) cooperates with the buoyant material (15 or 16, as the case may be) to hold the bait or fish lure at all times in substantially a horizontal position and against the tendency to assume a vertical position, and which latter tendency is objectionably characteristic of all known artificial baits or lures.

Also, in accordance with this invention a weed guard 26 may be used. In the preferred embodiment thereof the guard 26 is formed from a single length of wire bent into a substantial U and the legs thereof crossed as shown in Figure 7. The guard 26 is preferably used with the form of weight 24 shown in Figure 3. When employed, the bite portion 27 of the guard is engaged in a slot 28 provided therefor in the weight 24 and the legs of the guard extend rearwardly through the body of the lure to extend outwardly of the body and terminate in effective operative position relative to the bill of the hook 11 in a manner to prevent the hook becoming entangled with weeds. As is apparent the guard 26 will deflect weeds away from the hook 11.

It is believed that the manner of using the artificial bait or fish lure is apparent to those skilled in the art without detailed description; it being noted that the eye 13 on the shank of the hook 11 is exposed for connecting a line with the lure in the usual manner.

It will also be noted that a fish lure body having the features of construction herein detailed and capable of being fabricated by hand in the manner herein described also lends itself to the employment of a fish hook of the type having formed in the shank thereof a hump 29. Where a hump type of fish hook is employed, as shown to advantage in Figure 3, rotative movement of the body about and relative to the shank of the hook 11 is absolutely prevented and the hook and body portion of the lure are maintained in proper relation at all times.

While the invention has been described in detail in its presently preferred embodiments, it will, of course, be understood that such has been done for purposes of illustration only and not by way of limitation, and therefore only such limitations are to be imposed thereon as may reasonably come within the scope of the appended claims.

What I claim is:

1. A fish lure comprising a hook, a sheathing of thread wound tightly around the shank of the hook, a filler of hair around the sheathed shank and adhesively united with the sheathing, said hair filler being shaped to conform to the shape of the body of a fish, a filler of cotton around the hair filler and adhesively secured thereto, an outer skin of feathers adhesively secured to the cotton filler, said feathers having portions thereof projecting to form a top fin and a tail fin respectively, and a transparent protective coating over the outer surface of the skin-forming feathers.

2. An artificial minnow comprising a hook, a sheathing about the shank of the hook for substantially the full length thereof, an outer skin of feathers shaped to conform to the shape of the body of a minnow, and filler means interposed between the sheathed shank and outer skin comprising inner and outer layers of hair and cotton respectively.

3. A fish lure having a body comprising a hook, a sheathing about the shank of the hook for substantially the full length of the shank, a buoyant material secured to the sheathing adjacent the bill of the hook, superimposed adhesively united layers of hair and cotton around the sheathed shank and adhesively united with the sheathing, said layers of hair and cotton being shaped to conform to the shape of the body of a minnow, an outer skin of feathers adhesively secured to the cotton layer and having portions thereof projecting to form a top fin and a tail fin respectively, a weight united with the lure body adjacent the belly side thereof and adjacent the head end of the body, and a weed guard attached to the weight and having legs extending outwardly through the body and terminating in operative position relative to the bill of the hook.

JAMES M. MARSICO.

REFERENCES CITED

The following references are of record in the file of this patent:

UNITED STATES PATENTS

| Number | Name | Date |
|---|---|---|
| 1,557,083 | Peckinpaugh | Oct. 13, 1925 |
| 1,884,053 | McGarraugh | Oct. 25, 1932 |
| 2,018,622 | Davenport | Oct. 22, 1935 |
| 2,134,401 | Harvey | Oct. 25, 1938 |
| 2,148,799 | Billinski | Feb. 28, 1939 |